July 19, 1966   A. A. NEUWALD ET AL   3,261,512
DISPENSER UTILIZING MOVABLE BEAD CHAIN
Filed July 22, 1964
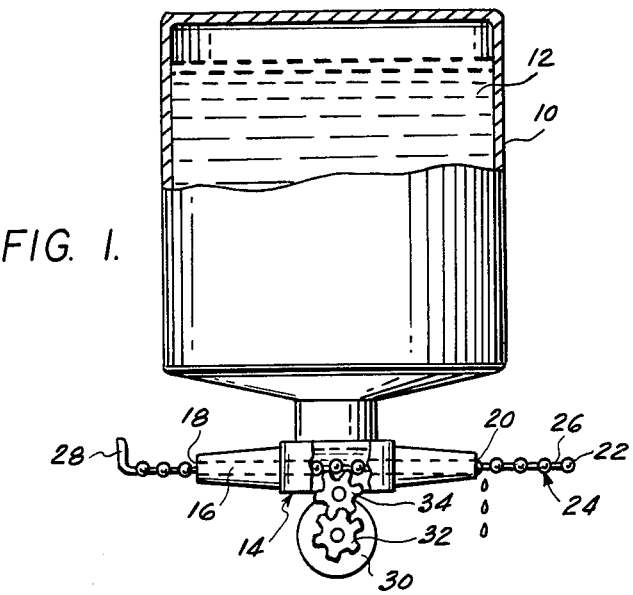
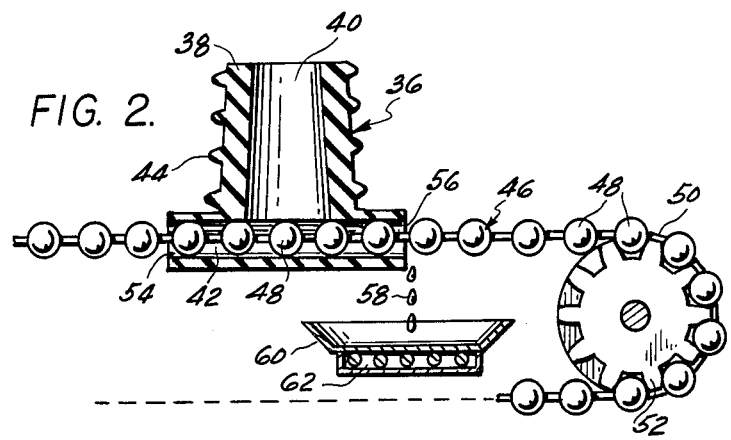
INVENTORS
ALFRED A. NEUWALD
BY William F. Donovan
McGlew and Toren
ATTORNEYS

United States Patent Office 3,261,512
Patented July 19, 1966

3,261,512
DISPENSER UTILIZING MOVABLE BEAD CHAIN
Alfred A. Neuwald, New York, N.Y., and William F. Donovan, Clifton, N.J., assignors to The Fragrance Process Company, Inc., New York, N.Y.
Filed July 22, 1964, Ser. No. 384,400
4 Claims. (Cl. 222—365)

This invention relates in general to a liquid dispensing device, and to a combination container-stopper and dispensing element, and in particular to a new and useful dispenser including a beaded chain which is adapted to be moved through a discharge passageway for dispensing liquid in controlled amounts out of the passageway.

The present invention is an improvement over the prior art inasmuch as it provides a device for the controlled dispensing of liquid either manually or by use of a controlled or timed delivery means. In its broadest aspect, the invention may comprise an element such as a stopper which is adapted to be positioned in a container and the container oriented, for example inverted, so that the liquid will be communicated with a lower discharge passageway defined in the stopper. The passageway has an entrance opening and a discharge opening at opposite ends and is large enough to accommodate a beaded chain which is passed through the entrance opening and out the discharge opening. Means are provided for moving the chain in order to effect the controlled dispensing of the liquid from the container through the passageway.

Accordingly, it is an object of the invention to provide an improved dispensing mechanism for liquids.

A further object of the invention is to provide a dispensing mechanism for liquids which includes means defining a passageway for the liquid with an inlet and an outlet opening and a beaded chain in the passageway directed through the inlet and outlet openings which is movable for propelling liquid out of the passage.

A further object of the invention is to provide a container-stopper having a displaceable beaded member which may be manipulated for dispensing controlled quantities of liquid from the container.

A further object of the invention is to provide a combination stopper and delivery mechanism for a container.

A further object of the invention is to provide a stopper for a container having a passageway defined therethrough through which a chain is adapted to run and be moved for dispensing liquid from the passageway and including means to drive the chain at a controlled rate.

A further object of the invention is to provide an accurately timed means for dispensing controlled quantities of liquid from a container.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a partial elevational and partial sectional view of a container having dispensing means constructed in accordance with the invention; and FIG. 2 is an enlarged sectional view of a stopper having a dispensing mechanism constructed in accordance with the invention.

Referring to the drawings in particular, the invention embodied therein in FIG. 1 comprises a container 10 having a liquid 12 therein which is dispensed through a dispensing device generally designated 14. In accordance with the invention, the dispensing device 14 comprises a stopper or terminal formation at the end of the container 10 which defines a liquid passageway 16 for receiving the liquid 12. The passageway 16 has an inlet opening 18 at one end and a discharge opening 20 at an opposite end. The openings 16 and 18 and the passageway are sized to permit the passage of bead elements 22 of a bead chain delivery device generally designated 24. The bead chain delivery device 24 indicated in FIG. 1 is made substantially rigid and link members 26 interconnecting the beads 22 hold the beads rigidly. One end of the chain dispensing device 24 includes a thumb grip portion 28 which may be manipulated by the thumb of a person's hand for moving the chain bead device 24 for dispensing liquid 12 from the container 10 from either opening 18 or 20 in accordance with which way the device is moved. The inward movement of the beads 22 through the inlet 18 permits the bringing in of air, and the simultaneous outward movement of the bead 22 through the outlet opening 20 effects the dispensing of the liquid when the device is pushed to the right, as indicated in the drawing. The liquid is trapped between the successive beads 22 and is delivered out of the passageway 16.

In some instances it is desirable to drive the beaded chain mechanism 24 through an electric motor 30 which is advantageously of constant speed and drives through a gear 32 which meshes with a gear or sprocket element 34 which engages with the beaded chain device 24. Rotation of the sprocket member 34 causes the teeth thereof to move between the beads 22 and advance the beaded chain device 24. Suitable timing means may be provided for rotating the gear 32 first in one direction and then in an opposite direction for effecting a dispensing cycle, for example.

In the embodiment indicated in FIG. 2, there is provided a combination container-stopper and dispensing device generally designated 36. The device 36 includes a stopper 38 made of a material such as plastic or rubber having a central bore 40 for receiving liquid to be dispensed, which communicates with a through passageway 42 at the lower end thereof. The stopper 38 is provided with threads 44 to permit the stopper to be securely positioned within the neck of a container. The dispensing mechanism 36 also includes the endless beaded chain 46 having bead members 48 separated by flexible or pivotally connected link members 50. In this embodiment illustrated in FIG. 2, an electric motor (not shown) drives a gear 52 which drives the endless chain 46 by engagement with the individual bead elements 48. The bead elements 48 are of a size such that they substantially fill the passageway 42 and rotation of the sprocket 52 causes them to move through an entrance opening 54 at one end of the passageway and out through a discharge opening 56 at the opposite end. Any liquid which moves downwardly through the bore 40 of the stopper 38 will be moved through the passageway 42 by the movement of the endless chain 46. The liquid trapped between beads 48 will be discharged as droplets 58 from the stopper downwardly onto a heating pan 60. At the same time air will be dropped between beads entering the opening 54 and brought into the bore 40.

The device indicated in FIG. 2 may be employed for vaporizing and vaporizable liquid which exits as droplets 58 and falls onto the pan 60. For this purpose a heating grid 62 is provided beneath the pan 60 and when switched on, the droplets will be vaporized as they hit the pan or slightly thereafter. The device may be employed, for example, for the controlled vaporization of a liquid to add the vapor or aroma to the atmosphere in controlled timed amounts.

While specific embodiments of the invention have been shown and described in detail to illustrate the application of the inventive principles, it will be understood that

What is claimed is:

1. A combination container stopper and liquid dispensing device comprising a stopper housing having a central hollow portion adapted to communicate with the interior of a container and a liquid passageway defined through said housing which is opened at each end and communicates intermediate its length with the central hollow portion, a rigid beaded chain extending through said passageway and out through at least one end thereof, said chain having a finger engaging means at the end extending out through said end of said passageway and being movable to cause liquid between successive beads to be moved along the passageway and out one end thereof as said chain is moved out this end.

2. A dispensing device comprising a reservoir of liquid, means at the lower end of said reservoir of liquid defining a passage with a first opening at one end and a second opening at the opposite end, said passage communicating intermediate its length with said reservoir, a rigid beaded chain arranged in said passageway and having spaced beaded members interconnected by link members of smaller dimensions, said beaded chain extending out through said first opening and having a thumb gripping portion defined thereon adjacent the end extending out through said first opening for pushing and pulling said chain through said passageway for trapping liquid from the reservoir in the passageway and moving the liquid therealong for dispensing the liquid out one of said first and said second ends of said passageway.

3. A stopper member for a liquid container comprising a stopper having a body portion engageable in a container neck and a central bore in said body portion for receiving liquid from the container and a through passage extending transversally into said bore and out of said bore adjacent the outer end of said body portion and terminating at one end in an inlet port and at an opposite end in an outlet port, a beaded chain associated with said stopper and having at least a portion thereof extending through said passage, said beaded chain comprising bead members interconnected by link members with the beaded chain members being substantially the same size as said passage, said beaded chain being movable through said passage for trapping liquid between beads and discharging a liquid out through said discharge port.

4. A stopper member for a liquid container comprising a stopper having a body portion engageable in a container neck and a central bore for receiving liquid from the container and a through passage extending transversally into said bore and out of said bore adjacent the outer end of said body portion and terminating at one end in an inlet port and at an opposite end in an outlet port, a beaded chain associated with said stopper and having at least a portion thereof extending through said passage, said beaded chain comprising bead members interconnected by link members with the beaded chain members being substantially the same size as said passage, said beaded chain being movable through said passage for trapping liquid between beads and discharging a liquid out through said discharge port, said beaded chain being an endless chain which is permanently associated with said stopper.

References Cited by the Examiner

UNITED STATES PATENTS

| | | | |
|---|---|---|---|
| 1,289,446 | 12/1918 | Griffiths | 222—284 |
| 2,223,684 | 12/1940 | Harrison | 103—73 |
| 2,361,663 | 10/1944 | Steine | 222—365 X |
| 2,510,657 | 6/1950 | Rapisarda | 103—72 X |
| 2,931,306 | 4/1960 | Hapman | 103—73 |
| 3,140,147 | 7/1964 | Neuwald et al. | 222—365 X |

FOREIGN PATENTS 104,849    5/1963    Netherlands.

RAPHAEL M. LUPO, *Primary Examiner.*

HADD S. LANE, LOUIS J. DEMBO, *Examiners.*